Patented Aug. 10, 1954

2,686,178

UNITED STATES PATENT OFFICE 2,686,178

HETEROCYCLIC DISAZO DYESTUFFS

Raymond Gunst, Binningen, Switzerland, assignor to Ciba Limited, Basel, Switzerland, a Swiss firm No Drawing. Application February 2, 1953, Serial No. 334,714

Claims priority, application Switzerland August 25, 1949

4 Claims. (Cl. 260—154)

This application is a continuation in part of my copending application Ser. No. 180,697, filed August 21, 1950. The present invention is based on the observation that the disazo dyestuffs of the formula (1)
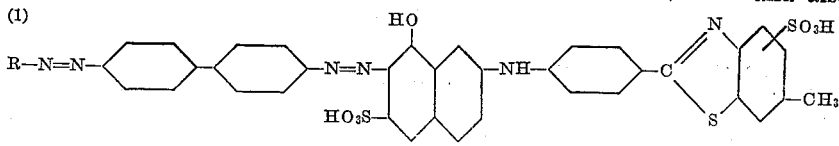

are very valuable dyestuffs. In this Formula 1, R represents a barbituric acid radical or a pyrazolone radical.

The disazo dyestuffs of the Formula 1 can be obtained by coupling tetrazotized 4:4'-diaminodiphenyl, in either sequence, on one side with 2-[4''-(8''-hydroxynaphthyl-[2'']-aminophenyl)]-6-methyl-benzthiazole-X:6''-disulfonic acid and on the other side with barbituric acid or a pyrazolone. However, as a rule it is of advantage to couple the tetrazo compound first with the 2-[4'-(8''-hydroxynaphthyl-[2'']-aminophenyl)]-6-methyl-benzthiazole-X:6'' - disulfonic acid in a weakly acid medium for example in a medium acid with acetic acid and buffered with an alkali acetate, and then to couple the so-obtained diazo-azo compound with the barbituric acid or pyrazolone in an alkaline medium.

As examples of pyrazolones to be used in the manufacture of the present disazo dyestuffs there may be mentioned 3-methyl-5-pyrazolone or 1-aryl-, especially 1-phenyl-5-pyrazolones, such as for example 1-naphthyl(2)-3-methyl-5-pyrazolone, 1-phenyl-5-pyrazolone-3-carboxylic acid or 1-phenyl-3-methyl-5-pyrazolone.

A method for the preparation of the 2-[4'-(8''-hydroxynaphthyl-[2'']-aminophenyl)]-6-methyl-benzthiazole-X:6''-disulfonic acid corresponding to the formula

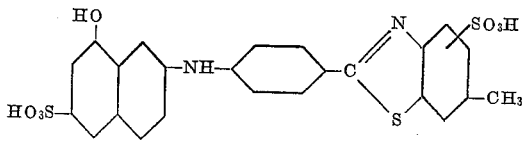

is given in Example 1 below.

The new disazo dyestuffs of the Formula 1 can be employed for the dyeing and printing of a wide variety of materials such as wool and silk but especially fibers containing cellulose, such as cotton, linen and also artificial silk and staple fibers of regenerated cellulose. Very interesting shades are obtained which, as a rule, possess good fastness properties, especially good fastness to light.

In the following example the parts and percentages are by weight unless otherwise stated, the relation between parts by weight and parts by volume being the same as that between the kilogram and the liter.

*Example*

18.4 parts of 4:4'-diaminodiphenyl are tetrazotized in known manner and the clear tetrazo solution is added to a neutral solution of 55 parts of 2 - [4'-(8''-hydroxynaphthyl - [2''] - aminophenyl)] - 6 - methyl-benzthiazole- X:6''-disulfonic acid to which 28 parts of crystallized sodium acetate have been added previously. After 4–6 hours' coupling at 10–15° C., the tetrazo compound cannot be detected any longer. The so-obtained diazo-azo compound is then added to an aqueous solution of 10 parts of 3-methyl-5-pyrazolone made alkaline with alkali bicarbonate, and a pH value of 7.0–8.0 is maintained, if necessary, by adding drop by drop a dilute sodium carbonate solution. Coupling proceeds slowly and comes to an end only after many hours' stirring. The coupling mixture is heated and sodium chloride is added to precipitate the dyestuff of the formula

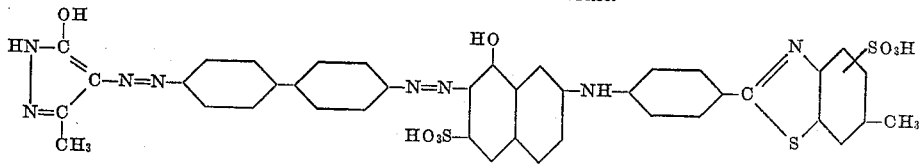

which, after drying, forms a dark powder. It dissolves in water with a dark brown coloration and dyes cellulosic fibers violettish dark brown tints which are distinguished by a good fastness to washing.

A dyestuff of similar properties is obtained when in the present example the 10 parts of 3-methyl-5-pyrazolone are replaced by 13 parts of barbituric acid. This dyestuff corresponds to the formula

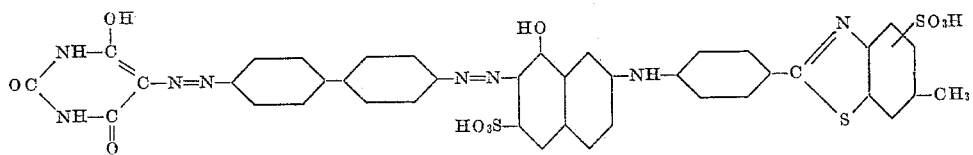

The 2-[4'-(8''-hydroxynaphthyl-[2'']-aminophenyl)] - 6 - methyl-benzthiazole-X:6''-disulfonic acid used as starting material in this example can be produced as follows:

24.0 parts of 1:7-dihydroxynaphthalene-3-sulfonic acid are suspended in 500 parts of commercial sodium bisulfite solution. At 95° C., 46 parts of 2 - (4'-aminophenyl)-6-methyl-benzthiazole-X-sulfonic acid (obtained by sulfonation of 2-(4' - aminophenyl) - 6-methylbenzthiazole with fuming sulfonic acid) are introduced and the reaction mixture is maintained for 60 hours with stirring and reflux cooling at 95–97° C. After cooling, the condensation product which is difficultly soluble in acid solution, is filtered off. For purification the filter residue is dissolved in the hot in a medium alkaline with sodium carbonate and freed from any insoluble residue by filtration. By addition of dilute hydrochloric acid the condensation product is precipitated as an orange-brown deposit. If desired the condensation product can be freed from sulfurous acid by heating the suspension, until the sulfurous acid has completely evaporated.

The 3-methyl-5-pyrazolone may also be replaced by 1-phenyl-3-methyl-5-pyrazolone or 1-phenyl-5-pyrazolone-3-carboxylic acid.

What is claimed is:

1. A disazo dyestuff of the formula

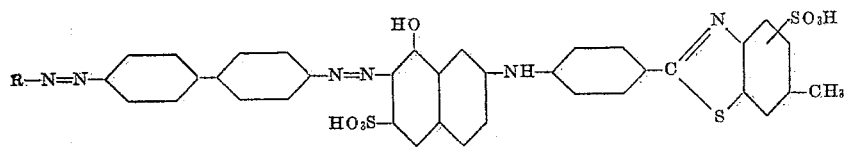

in which R represents a member of the group consisting of a pyrazolone radical and a barbituric acid radical.

2. A disazo dyestuff of the formula

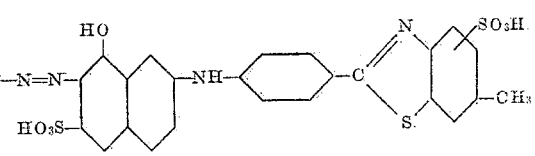

in which R represents the radical of a 5-pyrazolone bound to the azo group in its 4-position.

3. The disazo dyestuff of the formula

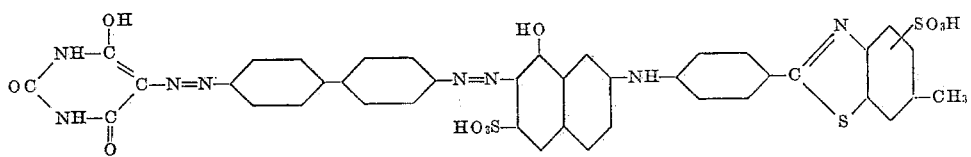

4. The disazo dyestuff of the formula

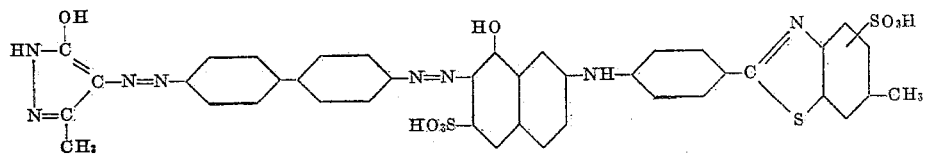

No references cited.